UNITED STATES PATENT OFFICE.

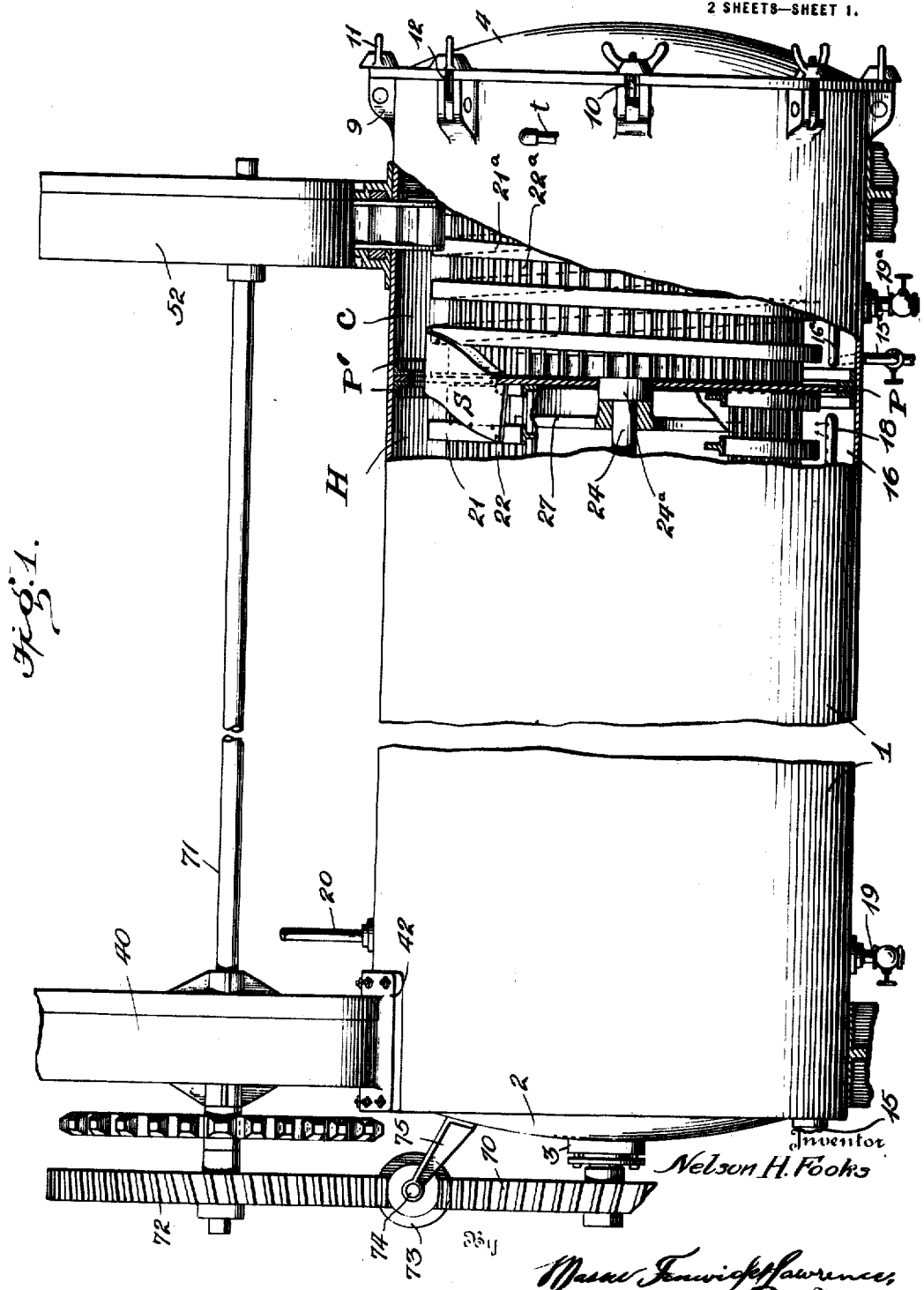

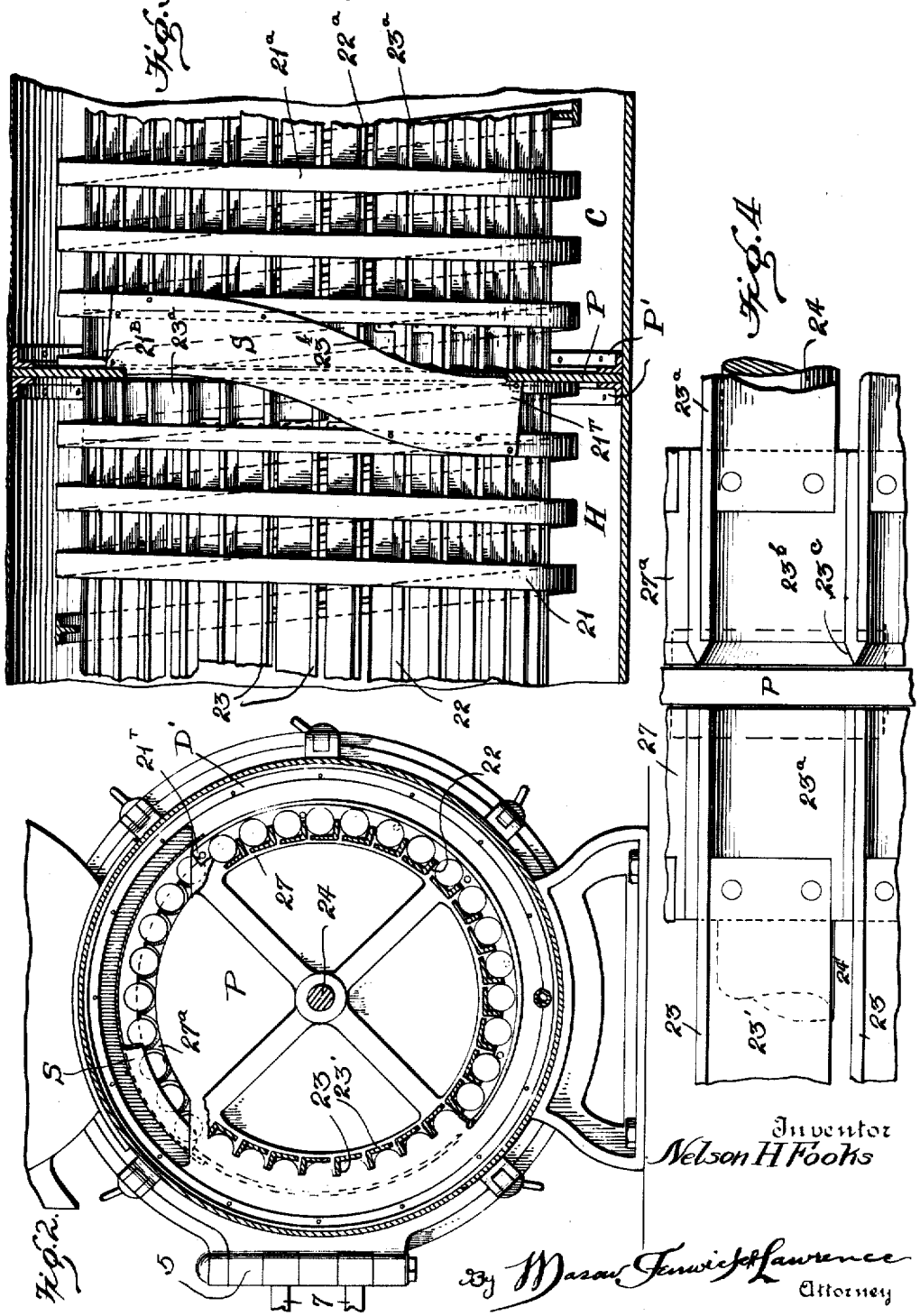

NELSON H. FOOKS, OF PRESTON, MARYLAND.

HEAT-TREATING FOOD OR OTHER SUBSTANCE.

1,354,962.  Specification of Letters Patent.  Patented Oct. 5, 1920.

Application filed January 24, 1920. Serial No. 353,652.

*To all whom it may concern:*

Be it known that I, NELSON H. FOOKS, citizen of the United States, residing at Preston, in the county of Caroline and State of Maryland, have invented certain new and useful Improvements in Heat-Treating Foods or other Substances; and I do hereby declare the following to be a full, clear, and exact description of the invention, such as will enable others skilled in the art to which it appertains to make and use the same.

This invention relates to heat treating objects, particularly to the cooking and sterilizing of foods packed in cans or other fluid tight receptacles. It is customary to cook or heat-treat certain canned foods in a fluid heated to relatively high temperatures,—to temperatures, for example, above 212° F. or above the boiling point of water in the atmosphere at sea level. In order to heat the usual fluids used in cooking canned substances to the required temperature it is necessary to subject them to heat in a retort or fluid tight container in order that their temperatures may be raised under pressure. Under such circumstances the pressure within the cans or similar food receptacles rises substantially to that of the pressure within the retort, and when the cans or like containers are suddenly removed and the pressure on the outside thereby reduced there is danger that the cans may be strained by, or give way under the excess of internal pressure. It is an object of this invention to so reduce the temperature of the cans while still within the retort, and subject to the pressure therein that was applied during the cooking, that when they are removed from the retort the internal pressure will be so reduced as to avoid the danger of straining the cans. The invention is particularly applicable to continuous processing apparatus wherein the cans and their contents are carried in continuous succession into and through the heating apparatus, and out into the exterior air.

In my Patent No. 1,318,985, dated October 14th, 1919, I have described an apparatus wherein objects are treated in water or other liquid heated to a temperature above its boiling point at normal atmospheric pressure, and ebullition of the liquid is suppressed by air or other fixed gas held under pressure above the surface of the liquid sufficient to achieve that end. By maintaining a highly heated liquid under sufficient pressure of a fixed gas to prevent ebullition, generation and escape of steam or other vapors is minimized, heat conserved, and serious inconveniences due to the escape of steam into the atmosphere of the factory avoided,—all as explained in said patent; and also in my applications Serial Nos. 346,578, filed December 22nd, 1919, and 334,280, filed October 29th, 1919. By using a fixed gas, such as air, under pressure sufficient to prevent ebullition of a liquid held in a fluid tight container, it is possible to cool the cans and their contents, before they are removed from the container, without stopping their progress through the container, and therefore without breaking the continuity of the process. Owing to the well known heat insulating properties of air and most fixed gases, it is possible to divide a retort or other fluid tight container adapted to contain air under pressure into a heating and a cooling chamber communicating with each other so as to insure equal pressures in said chambers and still maintain an adequate difference of temperature between the treating liquid in the heating chamber and the cooling fluid in the cooling chamber for the purpose in view.

In the accompanying drawings:

Figure 1 is a side elevation of my apparatus broken away in part to show the communicating heating and cooling chambers;

Fig. 2 is a section through the heating chamber looking toward the partition;

Fig. 3 is a horizontal section through a portion of the wall of the fluid tight container and the upper part of the partition between the heating and cooling chambers, showing the adjacent ends of the conveying means in full;

Fig. 4 is a detail of the adjacent ends of a rotary conveying rack with the partition between them where it affords communication between the two chambers.

Similar reference characters designate corresponding parts throughout the several views.

In the drawings, 1 designates a cylindrical shell, of boiler plate or the like, one end of which is closed by a head fixed thereto and having a central bearing boss 3. The other end of the shell is closed by a swinging door 4 hinged at 5, which admits of access to the interior of the retort or fluid-tight container formed by said shell 1 and ends 2 and 4. The weight of the door on the hinge is counterbalanced by counterweights (not shown) mounted on the arms 7, in a known manner. The end of the shell 1 that is closed by the door 4 is suitably reinforced, provided with a packing gasket of a known construction, and the usual bifurcated ears 9, to which are pivoted threaded bolts 10 carrying nuts 11, said bolts and nuts being adapted to clamp the door tightly in closed position by engagement with notches 12 in the margin of said door 4 in a known manner. In the top of the shell are a plurality of ports preferably in horizontal alinement. One of said ports is at the left of the retort shown in Fig. 1 and serves to admit the cans or other objects to be treated into one end of the retort. The other or discharge port is indicated near the right end of Fig. 1 and is the port through which the cans or other objects are discharged from the retort. Over each port is mounted a casing, 40 and 52 respectively, containing a rotary pocketed valve or air lock; that at the left of Fig. 1 being adapted to feed the objects into the retort without materially reducing the pressure, and that at the right of said figure being adapted to similarly discharge the treated objects, all as particularly described in said application Serial No. 346,578.

The fluid tight container is divided into two chambers, H and C, by a transverse partition P, which is secured to the cylindrical shell 1 by means of two annular angle bars P', or by any other suitable means. The partition P does not completely separate the two chambers H and C, but stops short of the top of the shell 1 in order to provide free communication between the upper portions of said chambers to allow free passage of gaseous fluid within the retort from one chamber to the other, and admit the passage of bodies being treated from the chamber H to the chamber C. The chamber H is the heating chamber into which the objects are first introduced and subjected to the action of a liquid heated to a relatively high temperature, and the chamber C is the cooling chamber into which the objects are introduced after the high heat treatment in order to reduce their temperature, while still under pressure, before discharging them to the exterior air. The partition P may be insulated if found desirable. As insulated walls are well known the drawing does not illustrate any insulating structure.

The said retort, or fluid tight container, as hereinbefore stated, is intended to be used for heat treating food, contained in cans, or other bodies, in a water or other liquid bath heated to a temperature higher than that at which said liquid would boil in the external atmosphere surrounding the retort, while boiling or ebullition, with its objectionable evolution of steam, or other vapor under high tension, is prevented by a volume of air or other fixed gas maintained under pressure for that purpose within the retort above the liquid. In order to admit the water or other liquid a pipe 15 may be provided, leading into the heating chamber H at any convenient point, as through the lower portion of the head 2, as indicated in Fig. 1. Said pipe 15 may be suitably opened or closed by a valve (not shown) of any suitable type. In order to heat the liquid, steam may be admitted into the liquid or into a coil or pipe 16 within said chamber H, and the steam may be controlled in said pipe or coil 16 by any suitable valve. In order to empty the chamber H, an outlet pipe 19 may be tapped into the bottom of the under side of the shell 1, as shown at the left of Fig. 1. Air or other fixed gas may be forced into the container through the pipe 20, as shown at the upper left hand portion of Fig. 1. The pipe 20 may connect the retort with a source of air under pressure or with an air compressor (not shown), as is well understood.

As a suitable means for conveying the cans or other objects through the heating bath over the longest practicable path in order to subject them to a high temperature during a period sufficiently long to cook or otherwise process them thoroughly, a spiral guide 21 is fixed within the shell 1 between the end wall 2 and the partition P. A rotary rack 22, provided on its perimeter with longitudinal flights or guide ribs, each formed by the flange 23 of an angle iron, the other flange 23' of which constitutes a shelf for supporting the objects, is mounted within the turns of said spiral guide and concentric therewith. The spiral guide 21 is formed of a T-section, metallic shape, bent into a spiral coil with the flanges on the convex side, forming, as it were, a single threaded screw, the insides of adjacent overlapping flanges of the T-iron constituting the tracks or surfaces on which the cans or other bodies are rolled or otherwise moved by the ribs 23 of the rotary rack. The said ribs 23 are spaced apart a distance to receive the cans or other objects between them, and, as the said objects roll or move along the spiral formed by the turns of the guides 21, are also pushed by the latter longitudinally of the rack, always toward the partition P.

The rack 22 is keyed or otherwise secured to a shaft 24 which projects at one end through the bearing boss 3 in the center of the head 2 and through a suitable stuffing box. The other end of said shaft is journaled in a hanger on the inside of shell 1 adjacent the door 4 in any suitable manner, but preferably as shown in application Serial No. 346,578. Between its ends said shaft 24 passes through a fluid tight journal box 24$^a$ in the partition P. The rack 22 comprises a suitable number of spiders mounted on shaft 24, preferably of cast iron and having spokes and rims, to which the ribs or flights 23 are secured. The spider 27 at that end of the rack which is in the chamber H adjacent the partition P has, in the outer surface of its rim, a series of pockets 23ª of a width equal to the space between the ribs or flights 23, and in line with the space between said guide ribs, so that said pockets form a continuation of, and the terminals of, the paths of the cans or other objects in their movements between the flights or guide ribs of the rotary rack. The cans or other objects in their movements along the ways between the flights 23 pass freely and without obstruction into and through said pockets.

The beginning of the spiral guide track 21 is directly beneath the charging port through which the charging valve or air lock comprised within the casing 40 feeds the objects, and said objects are adapted to be placed by the charging valve between two guide flights 23 at one end of the rack 22 and be moved by the latter into the entrance end of the spiral track and along said track to its terminal. The terminal of the guide track 21 is at 21ᵀ adjacent to the lower edge of the opening in the partition P, and at one end as illustrated in Fig. 2.

In the chamber C is a spiral guide track 21ª substantially the same as the guide 21 in the chamber H. The beginning or entrance end of the guide track 21ª is on the opposite side of the partition P from that adjacent to which the track 21 terminates, and at the opposite end of the opening forming the communication between the chambers H and C. The spiral turns of the track 21ª are of the same pitch as those of the track 21, and extend in the same spiral path. As, however, the partition P intersects the container and the spiral track, it is necessary to discontinue the T iron between the terminal point 21ᵀ and beginning point 21ᴮ so that a can or other object may be shifted longitudinally of the rack 22 from one side of the partition P to the other side thereof, that is, from the chamber H to the chamber C. The terminal of the track 21ª is directly beneath the discharge port beneath the casing 52. Concentric with the turns of the guide track 21ª is a rotary rack 22ª having ribs 23ª. The rack 22ª is secured to the shaft 24, and the ribs 23ª are in exact alinement with the ribs 23 of rack 22. A spider 27ª having pockets 23ᵇ in its perimeter sustains the flights or guide ribs 23ª at that end which is adjacent to the partition P. The pockets 23ᵇ in the perimeter of the rack 27ª, are the same as the corresponding and alined pockets 23ª in the spider 27 on the other side of partition P, except that said pockets 23ᵇ have flaring ends formed by beveling the walls thereof as indicated at 23ᶜ. The beveled portions serve as guides to insure the proper entrance of a can endwise into the pocket 23ᵇ, and compensate for any slight misalinement that may occur through wear or the effects of temperature changes or otherwise.

In order to shift the cans or other objects endwise a distance equal to the distance between two turns or threads of the track, a cam device S in the nature of a cross-over is provided, comprising a curved plate with parallel flanges on each side spaced a distance apart equal to the spacing of the turns of the track iron 21. The flanges project from the concave side of the cam plate S, and the curvature of the cam plate is the same as that of the track. The said cam plate connects the end of the path in chamber H with the beginning of the path in chamber C. The entrance and exit ends of the cam or cross-over S is pitched at the same angle as the T-irons 21—21ª, but between the ends the pitch of the cross-over must be sufficient to move the object one turn or thread space to shift it quickly from chamber H to chamber C. The cam or cross-over S may be bolted or otherwise conveniently connected to the irons 21—21ª and its flanges constructed to merge smoothly with the under ribs or guiding portions of the T irons.

Pipes 15ª, 19ª may be provided for the purpose of admitting water or suitable cooling liquid into or discharging it from the chamber C, whereby cool liquid may be kept in said chamber as desired. Obviously a refrigerating pipe or coil may be led into said chamber C if found desirable, as at 16ª.

The means to drive the movable parts is as follows: In the bracket 15 a drive shaft 74 is mounted. The shaft 74 carries a worm 73 which meshes with worm wheels 70 and 72. The worm wheel 70 is fixed to the shaft 24 and rotates the conveyer racks 22 and 22ª. The worm wheel 72 is secured to the shaft 71 and rotates the pocketed feed and discharge valves or rotary air locks, all as described in the said application Serial No. 364,578.

In using the apparatus for processing canned foods, water will be admitted into chamber H to a desirable level, say to a level midway between the shaft 24 and the communicating opening in the partition P. The temperature above 212° at which it is desired to cook, having been predetermined, air will be forced through the pipe 20 until there is sufficient pressure upon the water to suppress ebullition of the water at that temperature, and steam will then be turned on to heat the water accordingly. Cans will be fed in continuous succession through the air tight feed valve or rotary air lock within the casing 40 and will be caused to travel continuously and successively around the spiral trackway 21, and from end to end of the chamber H. As soon as a can reaches the end of trackway 21 it will be shunted into the chamber C by the cam or cross-over S and will continue its spiral travel within the cooling chamber C until it reaches the end of spiral pathway 21ª where it will be discharged through the discharge port by the rotary pocketed discharge valve within the casing 52. As air is a poor conductor of heat and is continuously forced into the container above the water so as to keep the pressure at the desired point, the air does not become heated to the cooking temperature and fills at equal pressure all spaces in the chambers H and C not occupied by other bodies. The cooking is accomplished while the cans are submerged in the heated water, and after they have been shunted to the cooling chamber C they will be moved continuously during a considerable period through the body of relatively cool air in said chamber. But cold water may be kept in said chamber, as explained, and may be replenished as it becomes heated. By insulating the partition P transfer of heat between the heating and cooling chambers may be kept to a minimum. When therefore the treated cans are ejected through the rotary air lock 52, the temperature thereof will have been so reduced that the difference between the pressure inside the cans and the normal atmospheric pressure will not be sufficient to cause breakage of the cans.

It will be understood that suitable thermometers, pressure gages, depth indicators or other instruments adopted to afford information respecting conditions within the container and the chambers therein may be applied as found desirable, and that suitable control over these conditions may be exercised by heat, pressure or liquid depth responsive instruments, as is well understood and as illustrated in said application Serial No. 334,280.

A circulation of water in cooling chamber C can be maintained either by a force pump forcing cool water through the cooling chamber, or by a stand-pipe of such elevation as will overcome air pressure within the container; and allow the water to flow into said chamber. The overflow may pass off through a suitable trap connected with said chamber, as at "t" in Fig. 1.

What I claim and desire to secure by Letters Patent is:

1. A heat treating apparatus comprising a container divided into a plurality of chambers the upper portions of which are in communication, a spiral track within each chamber, the tracks being disposed substantially end to end and substantially coaxial with respect to each other, means within each chamber adapted to move objects along said spiral track, and transfer means adapted to shift the objects from the end of the spiral track in one chamber to the beginning of the spiral track in an adjacent chamber.

2. A heat treating apparatus comprising a container divided into a plurality of chambers having their upper portions in communication, a spiral track within each of said chambers, said tracks being discontinuous and arranged end to end in coaxial relation, a fixed cam between the end of the track in one chamber and the beginning of the track in an adjacent chamber, said cam being adapted to shift objects from one track to another, and a rotary member adapted to cause the objects to travel along said tracks and cam.

3. A heat treating apparatus comprising a container divided into a plurality of chambers the upper portions of which are in communication, spiral tracks, one within each chamber, arranged end to end and substantially coaxial with respect to each other, said tracks being discontinuous and each being formed of an angle bar having its flanged portion outward, a rotary ribbed rack concentric with the turns of each spiral track, a fixed cam of greater pitch than the spiral track between the end of the track in one chamber and the beginning of the track in an adjacent chamber, said cam being adapted to guide the objects through an opening from one chamber to another.

4. A heat treating apparatus comprising a fluid tight container divided into a plurality of chambers the upper portions of which are in communication with each other, means whereby differences of temperature may be maintained in said chambers, respectively, and means within said container for transferring objects in the container from one chamber to another in succession.

5. A heat treating apparatus comprising a fluid tight container divided into a plurality of chambers in communication with each other, means whereby differences of temperature may be maintained in said chambers, respectively, an air lock mechanism through which objects may be fed into one of said chambers, means for receiving said objects admitted through the air lock and conveying them through the said chambers in succession, and a discharging air lock arranged to discharge treated objects from another of said chambers.

6. A heat treating apparatus comprising a fluid tight container divided into a plurality of communicating chambers, means whereby different temperatures may be maintained in said chambers, means for forcing a fixed gas under pressure into said container, and means for transferring objects within the container from one chamber to another in succession.

7. A heat treating apparatus comprising a fluid tight container divided into communicating chambers, means for forcing a fixed gas under pressure into the container, means for maintaining different temperatures in said chambers, an air lock device for feeding objects into one of the chambers, means for conveying objects through the chambers in series, and an air lock device for discharging the treated objects from another chamber.

8. A heat treating apparatus comprising a fluid tight container divided into a plurality of chambers the upper portions of which are in communication, means for admitting a heating liquid into one of said chambers, means for heating said liquid, means for admitting a cooling liquid into another chamber, means for forcing a fixed gas under pressure into said container, and conveying means within the container for transferring the objects treated from the heating to the cooling chamber.

9. The process of heat-treating materials in sealed receptacles which consists in heating said sealed receptacles in a liquid bath within a fluid tight container, said bath being heated to a temperature higher than the temperature at which the liquid boils in the atmosphere surrounding the container, preventing ebullition of the liquid by a fixed gas held under pressure within the container above the liquid, and cooling the sealed receptacles within the container while still maintaining them under the same pressure of the said fixed gas.

10. A process of heat-treating materials in sealed receptacles which consists in heating liquid in a closed container to a temperature higher than the temperature at which it boils in the atmosphere surrounding the container, preventing ebullition of the liquid by a fixed gas held under pressure within the container above the liquid, passing the sealed receptacles continuously through the heated liquid and through a cooling fluid within the container while still maintaining said receptacles under the same pressure of said fixed gas.

11. A process of heat treating objects in a fluid tight container divided into a plurality of communicating chambers containing liquid, which consists in maintaining the liquid in different chambers at different temperatures, respectively, maintaining a fixed gas under pressure within said container, introducing objects to be treated into said container, moving said objects through the several chambers in succession, thereby subjecting them successively to treatment in the liquid of different temperatures, and finally removing the treated objects from the container.

In testimony whereof I affix my signature.

NELSON H. FOOKS.